RECTANGULAR EXTRUSION
Filed May 24, 1965 2 Sheets-Sheet 1
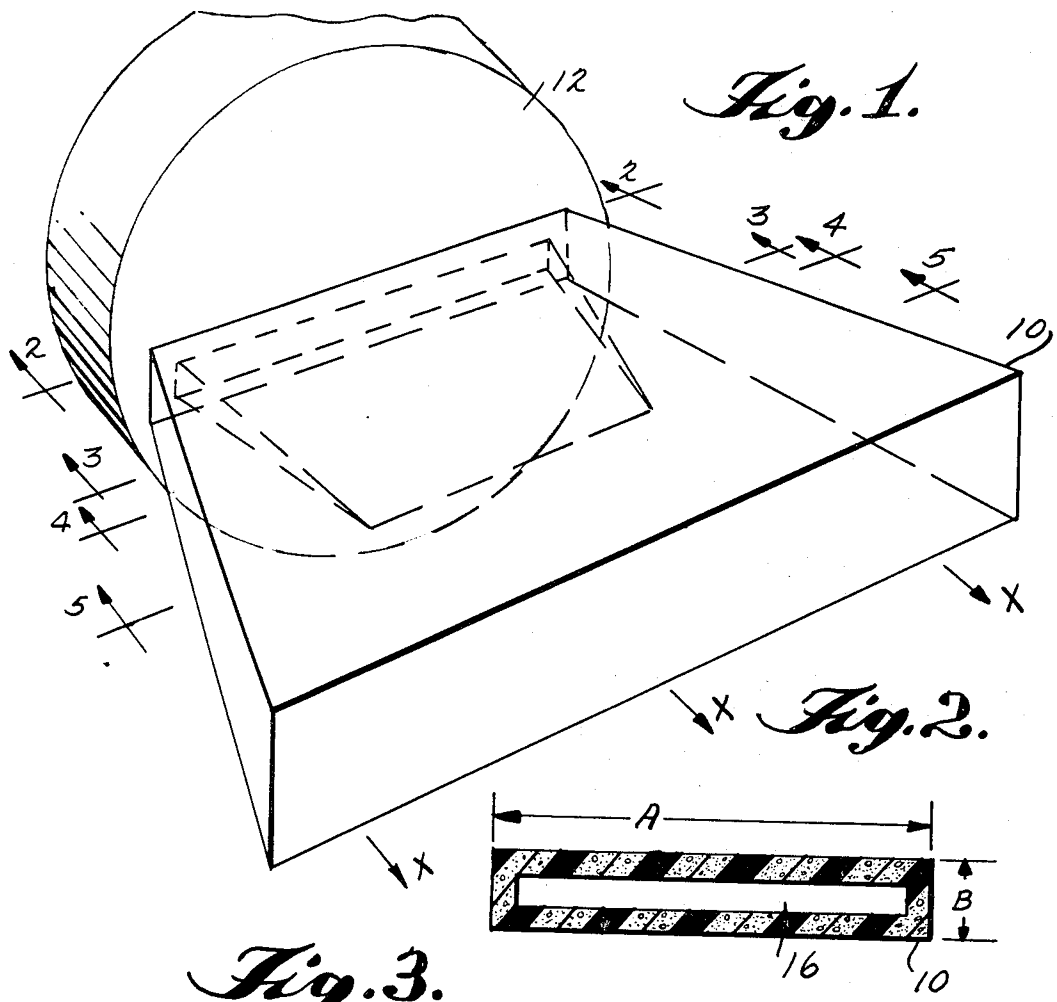
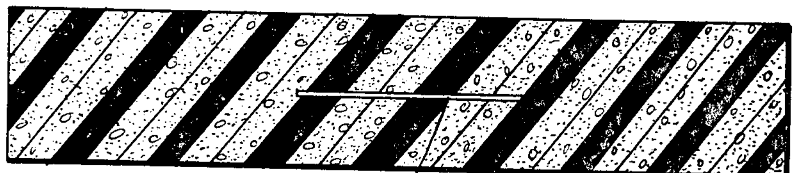
INVENTORS
ERNEST O. OHSOL
JOHN H. LUX
BY Cushman, Darby & Cushman
ATTORNEYS RECTANGULAR EXTRUSION
Filed May 24, 1965 
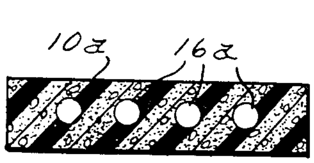
Fig. 7.
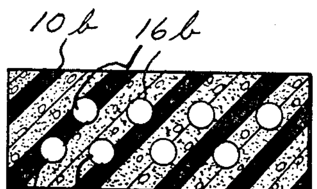
Fig. 8.
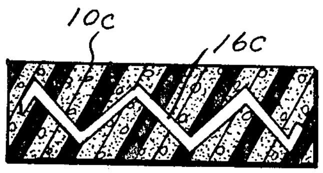
Fig. 9.
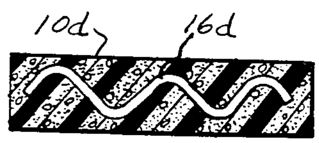
Fig. 10.
10e 16e
Fig. 11.
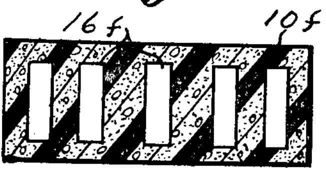
Fig. 12.
Fig. 6.
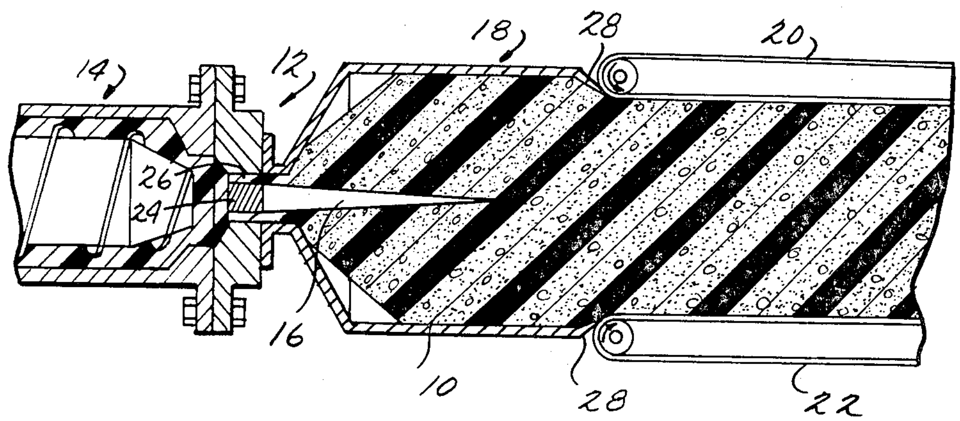
INVENTOR
ERNEST O. OHSOL
JOHN H. LUX
BY Cushman, Darby & Cushman
ATTORNEYS United States Patent Office 3,413,388

Patented Nov. 26, 1968

1

3,413,388

RECTANGULAR EXTRUSION

John H. Lux and Ernest O. Ohsol, Wilmington, Del., assignors to Haveg Industries, Inc., Wilmington, Del., a corporation of Delaware Filed May 24, 1965, Ser. No. 458,191
9 Claims. (Cl. 264—46)

ABSTRACT OF THE DISCLOSURE

Thick foamed plastic shapes, such as sheets, having uniform density in the transverse dimension are made by extruding the initial shape as a tubular body having one or more holes extending in the direction of extrusion and then allowing the plastic to foam so as to expand at right angles to the direction of extrusion and fill the holes. The shape may also be compressed to insure coalescence of the walls of the holes.

This invention relates to the formation of thick bodies of foamed plastic material. More in particular, it relates to an extrusion process for forming thick foamed plastic sheet-like bodies having uniform density throughout and freedom from surface irregularities.

It is known that relatively thin foam plastic sheets and small diameter rods or the like can be produced by extrusion of foamable plastic material with ordinary extrusion techniques. For example, both sheets and rods can be produced by extruding the foamable material through a die of suitable configuration, a die having a slot-shaped orifice being employed for sheets and a die of more uniform transverse shape being employed for rods. Additionally, foam sheets may be made by extruding the plastic material through an annular die orifice in the shape of a thin walled tube and subsequently splitting the tube lengthwise. Foam plastic rods and sheets find utility the fields of thermal insulation, package construction and boat or other buoyant construction.

The conventional extrusion techniques referred to above are suitable for producing sheets or slabs of relatively small thickness. When the thickness is large, however, the extruded sheet tends to develop surface irregularities and undesirable variations in density in the transverse direction. These defects apparently result from the expansion of the plastic material at right angles to the direction of extrusion. In the case of thin shapes all or substantially all the plastic is free to expand to its full extent, but in thicker shapes expansion of the innermost plastic tends to be contained or repressed by the outermost plastic thus producing density differences. In any event, regardless of the mechanism of expansion, thick extruded sheets tend to develop surface corrugations when the plastic expands. In the case of extruded thick rod-like shapes surface cracks or splits tend to develop. The thickness beyond which these difficulties develop varies with process condition such as the expansion ratio of the material being extruded, extrusion rate and die shape. In general the undesirable features appear when the thickness exceeds about $\frac{1}{10}$ inch.

It is the object of the present invention to provide an improved process for making thick foam plastic shapes which are free from the surface irregularities and density variations usually associated with thick foam extrusions, the process comprising extruding a foamable plastic in the form of a single tubular body in such a manner that upon complete or substantially complete foaming of the plastic material the wall of the tube expands uniformly to close or substantially close the bore. The final foamed body, usually after being slightly compressed at right angles to the direction of extrusion, is a solid in the sense that it has no continuous hole extending therethrough in the direction of extrusion.

2

The process of the present invention is particularly adapted to the manufacture of sheets, slabs or other bodies having an elongated transverse cross section. Accordingly, it is a more specific object of the invention to provide a process in which foamable plastic is extruded in the form of a snigle tubular body of elongated transverse cross section and elongated transverset bore in such a manner that the longer walls of the tube expand uniformly to close the bore in the manner described above.

In the process of the present invention the bore of the initially extruded tubular shape may be a single hole or it may be in the form of a plurality of parallel holes which are spaced apart in the transverse direction of the extrusion. In either case the desired uniformity of density and the proper closing of the bore by expansion of the plastic depends on a proper selection of the size and shape of the bore, the thickness of the plastic walls surrounding the bore and the relative dimensions of the desired final cross section. The process is suitable for making extrusions up to about 6 inches final thickness.

In the preferred form of the invention, in which the extrusion is generally rectangular or otherwise of sheet-like or slab-like shape the bore of the initial extrusion is similarly of overall elongated cross section even though it may be in the form of a plurality of spaced holes or in the form of an irregularly shaped single hole.

The invention will be further understood from the following detailed description taken with the drawings in which:

FIGURE 1 is a schematic perspective view illustrating the production of a thick slab of foam plastic by an extrusion process embodying the principles of the present invention;

FIGURE 2 is a sectional view, taken on the line 2—2 of FIGURE 1, illustrating the cross sectional shape of the plastic immediately after extrusion;

FIGURES 3, 4 and 5 are sectional views of the slab of FIGURE 1 taken on the lines 3—3, 4—4 and 5—5 respectively;

FIGURE 6 is a longitudinal vertical sectional view of an extruder and associated equipment for making the slab of FIGURE 1; and FIGURES 7, 8, 9, 10, 11 and 12 are sectional views, analogous to the view of FIGURE 2, illustrating different bore configurations of an extruded shape immediately after extrusion.

In FIGURE 1 there is illustrated schematically a foam plastic mass 10 of conventional composition issuing from a die plate 12 of an extruder 14 in the direction of arrows X. The mass 10 is extruded in the initial shape of a tube having a rectangular perimeter and a bore in the form of a single rectangular hole 16, this configuration being achieved by means of a die orifice of suitable annular shape. Immediately upon issuance of the mass 10 from the die orifice the plastic material foams and begins to expand, complete expansion taking place rather rapidly. Generally, the final cross sectional area transverse to the direction of extrusion will be about 4 to 10 times the cross sectional area of the initially extruded mass, although this figure will vary with the expansion ratio of the plastic and process variables such as extrusion rate.

According to the principles of the invention the transverse configuration of the initially extruded slab is chosen so that the subsequent expansion of the plastic material at right angles to the direction of extrusion will close or substantially close the hole 16. In the embodiment illustrated in FIGURES 1–5 the hole 16 is dimensioned so as to provide initially a uniform plastic wall thickness of about the same thickness as the vertical dimension of the hole. At the same time the ratio of the long transverse dimension or width of the extrusion 10, illustrated at A in FIGURE 2, to the short transverse dimension or thickness, B, is selected at about 6. This relationship of size and shape has been found to be suitable for a wide range of foamable compositions.

Referring to FIGURES 3, 4 and 5 it will be seen that the cross section of the hole 16 decreases in both length and width as the extruded mass 10 moves away from the die plate 12. At the same time the cross section of the mass 10 increases in both directions. When the foaming plastic has expanded to its full extent, as illustrated in FIGURE 5, the hole will have been reduced to a thin slit or may even have disappeared by coalescence of the upper and lower walls of the mass 10. The final external width and thickness is about twice the original width and thickness. It will be observed, also, that the ratio between the external width and thickness of the mass 10 remains about the same during foaming.

The hole 16 will not always close completely upon expansion of the plastic and it will generally be desirable to apply a small amount of compression to the extruded mass 10 at right angles to the thickness of the extrusion after expansion has taken place. This may be accomplished with pairs of oppositely disposed rollers or endless belts or by passing the extrusion through a stationary die-like former or guide.

FIGURE 6 illustrates in somewhat more detail an apparatus for producing the rectangular extruded mass 10 which has been described in connection with FIGURES 1–5. As shown, the apparatus includes a conventional screw extruder 14 having the die plate 12 at its forward end, a stationary former 18 adjacent the die plate 12 and a pair of opposed endless belts 20 and 22 for carrying off the extruded mass 10 from the former 18. The orifice in the die plate 12 is defined by a rectangular mandrel portion 24 encircled by a rectangular slot 26, the relative dimensions of these elements producing the cross sectional extruded shape shown in FIGURE 2.

The walls of the former 18 define a rectangular bore of about the same cross section as the fully expanded mass 10. The downstream end of the bore is slightly restricted by an inclined flange 28 which projects inwardly toward the axis of extrusion so as to compress the mass 10 as it passes out of the former 18. The flange 28 may extend around the entire perimeter of the downstream end of the former 18 or it may be provided only along the upper and lower edges. The endless belts 20 and 22 grip the mass 10 along its upper and lower surfaces and carry it away in the direction of extrusion at about the rate of extrusion.

The purpose of the former 18 is to aid in shaping the exterior contours of the plastic mass 10 and to insure that the wide upper and lower walls of the hole 16 are brought into contact with each other. In some cases it will be preferable to omit the former 18 entirely or to rely on simple rollers or endless belts to compress the walls. The former 18 or the belts 20 and 22 may be provided with cooling means such as a water spray if desired.

Slabs of rectangular cross section are desirable from the standpoint of versatility of use, and accordingly, the foamable plastic will generally be extruded in a form having a rectangular perimeter. However, the process of the invention is applicable to other shapes having an elongated cross section. As indicated before, the shape of the bore need not correspond precisely to the exterior shape of the extruded mass so long as the thicknesses of plastic surrounding the bore are given freedom to expand without creating density differences and surface defects. Thus, the bore of the freshly extruded mass may be in the form of a hole of irregular shape or in the form of a plurality of holes of various shapes. However, the average or overall configuration of the bore, whether it be one hole or many holes, must generally conform to the elongated cross section of the mass 10 in order to avoid thick areas which will not foam properly.

Referring more specifically to the relationships between the size of the bore and the overall cross section of the foaming mass 10 it has been found that the process is most successful when employed for making sheets, slabs or the like which have a width to thickness ratio of at least 6 to 1 and preferably 10 to 1 or greater. That is, the dimension A shown in FIGURE 2 should be at least 6 times and preferably 10 times dimension B. In the simple rectangular form shown in FIGURE 2 the ratio of the thickness of the hole 16 to the total thickness B of the mass 10 should be at least 0.25 and preferably 0.5 or somewhat greater for expansion ratios of 3 to 1. Of course, the maximum figure for this ratio is limited to a value at which the wall thickness of the bore is sufficient to close or substantially close the bore upon expansion. When the bore is of irregular shape or consists of a plurality of holes, the same relationships hold, although in these cases the small dimension of the bore must be averaged or estimated on the basis of the overall configuration of hole or holes.

FIGURES 7–12 illustrate several suitable bore configurations for extruding rectangular foamable tubes which will expand in the manner described above to produce sheets or slabs having substantially no longitudinal holes. In FIGURE 7 the plastic mass **10*a* is provided with a single row of round holes 16*a*, and in FIGURE 8 the mass 10*b* is provided with two rows of holes 16*b* offset from one another. FIGURES 9 and 10 illustrate, respectively, masses 10*c* and 10*d* having a zig-zag hole 16*c* and a wave-shaped hole 16*d*. In FIGURE 11 the bore is formed by a plurality of rectangular holes 16*e* extending across the long dimension of the cross section of the mass 10*e*. In FIGURE 12 the bore is formed by a plurality of rectangular holes 16*f* extending across the short dimension of the mass 10*f***. In each of these views it will be observed that the overall or average configuration of the bore conforms generally to the elongated cross section of the plastic mass.

In making the foam sheets or slabs of the present invention there can be employed many different types of foam plastics.

In making the foam sheets or slabs of the present invention there can be employed many different types of foam plastics.

When employing polystyrene there can be employed normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. Preferably, the polystyrene is at least 10% high impact polystyrene. High impact polystyrenes are frequently prepared by polymerizing monomeric styrene in the presence of 2 to 15% by weight of a rubbery diene polymer or by polymerizing styrene in the presence of such amounts of a difunctional material. Examples of high impact styrene include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chlorosulfonated polyethylene and 95% styrene; a blend of 97.5% polystyrene and 2.5% polybutadiene; a blend of 95% polystyrene and 5% hydrogenated polybutadiene containing 35.4% residual unsaturation; polystyrene formed in the presence of 5% hydrogenated polybutadiene containing 4.5% of residual unsaturation; a blend of 95% polystyrene and 5% polyisoprene, a blend of 98% polystyrene with 2% rubbery butadiene-styrene copolymer, a blend of 85% polystyrene with 15% rubbery butadiene-styrene copolymer, and a copolymer of 99.5% styrene and 0.5% divinyl benzene.

Unless otherwise indicated, all parts and percentages are by weight.

Other suitable thermoplastic resins and polymers include chlorinated rubber, cellulose ethers and esters, e.g., ethyl cellulose, cellulose acetate, cellulose acetate-butyrate, bituminous materials, e.g., asphalt and coal tar pitch, paraffin wax, homoploymers and interpolymers of monomeric compounds containing the $CH_2$=C grouping, such as olefins, e.g., ethylene, propylene, isobutylene, butene-1, vinyl halides, e.g., vinyl chloride and vinyl fluoride, vinylidene chloride; vinyl esters of carboxylic acids, e.g., vinyl acetate, vinyl stearate, vinyl benzoate, vinyl ethers, e.g., vinyl methyl ether, vinyl ethyl ether, vinyl isobutyl ether; chlorotrifluoroethylene, tetrafluoroethylene, hexafluoropropylene, unsaturated carboxylic acids and derivatives thereof, e.g., acrylic acid, methacrylic acid, methyl acrylate, methyl alpha chloroacrylate, ethyl acrylate, methyl methacrylate, acrylamide, acrylonitrile, methacrylonitrile, and intrepolymers of the above-mentioned vinylidine monomers with alpha, beta-unsaturated polycarboxylic acids and derivatives thereof, e.g., maleic anhydride, diethyl maleate, dibutyl fumarate, diallyl maleate, dipropyl maleate, etc. A preferred class of materials with which the optimum results are obtained are rigid, relatively nonelastic, thermoplastic resins such as homopolymers and interpolymers of vinyl chloride, e.g., polyvinyl chloride, vinyl chloride-vinyl acetate copolymer (87:13), vinyl chloride-acrylonitrile copolymer (80:20); homopolymers of vinyl aromatic hydrocarbons and ring halogenated derivatives thereof, e.g., styrene, o-chlorostyrene p-chlorostyrene, 2,5-dichlorostyrene, 2,4-dichlorostyrene, p-methylstyrene, p-ethylstyrene, alpha-methylstyrene, vinyl naphthalene and interpolymers of such vinyl monomers with each other and with other vinyl monomers in which the interpolymer contains at least 70% of the vinyl aromatic hydrocarbon compound, e.g., a copolymer of 70% styrene and 30% acrylonitrile. As previously indicated, for many uses the most preferred resins are thermoplastic styrene polymers containing at least 70% by weight styrene in the structure.

Additional suitable thermoplastic resins include polycarbonates, e.g., the polymer from Bisphenol A and diphenyl carbonate; polyoxymethylene (Delrin), oxymethylene-alkylene oxide copolymers, e.g., oxymethylene-ethylene oxide (95:5) polyurethanes, e.g., prepolymers from toluene diisocyanate and polypropylene glycol molecular weight 2025; or glycerine propylene adduct molecular weight 3000 or butane diol 1,4-adipic acid polyester; Dacron (polyethylene terephthalate), nylon (e.g., polymeric hexamethylene adipamide). ABS terpolymers can be used, e.g., the terpolymer of 25% butadiene, 15% acrylonitrile and 60% styrene (a rigid ABS terpolymer), as well as other terpolymers containing 25 to 60% butadiene, 10 to 20% acrylonitrile, and 20 to 60% styrene.

The present invention is of particular value in preparing foamed articles from polyethylene (of high density, e.g., 0.960 medium density, e.g., 0.935 or low density, e.g., 0.914), polypropylene, copolymers of ethylene and propylene (e.g., 50:50 copolymer, 60:40 copolymer and 20:80 copolymer), regular or high impact polystyrene, acrylonitrile-butadiene-styrene terpolymer, polyvinyl chloride (preferably rigid polyvinyl chloride), copolymers of ethylene with minor amounts of alpha, olefins having 4 to 10 carbon atoms such as butene-1 (e.g., 90:10 and 97.5:2.5) or octene-1 (96:4); terpolymers of ethylene, propylene and up to 5% of a nonconjugated polyolefin such as alloocimene, pentadiene-1,4 and dicyclopentadiene, e.g., a terpolymer of 60% ethylene, 39% propylene and 1% dicyclopentadiene or pentadiene 1,4.

There can also be prepared foamed articles from fluorocarbon polymers such as polytetrafluoroethylene, polyhexafluoropropylene and tetrafluoroethylene-hexafluoropropylene copolymer (e.g., 50:50).

In forming the foamed plastic, there is preferably utilized a nucleating agent, e.g., in an amount of from 0.02 to 10%, preferably 0.4 to 5% of the weight of the polymer.

Conventionally, the nucleating agents are made up of two materials which react to form carbon dioxide and water. The two materials are normally used in approximately equivalent amounts. As the carbon dioxide liberating materials there can be used ammonium, alkali and alkaline earth carbonates or bicarbonates, e.g., ammonium bicarbonate, sodium bicarbonate, sodium carbonate, potassium bicarbonate, calcium carbonate. The other material is an acid or acid-reacting salt, preferably solid, which is sufficiently strong to liberate the carbon dioxide from the carbonate or bicarbonate. Generally, the acid has at least 3.0 milliequivalents of acidic hydrogen, and preferably at least 10.0 milliequivalents, per gram. The acid can be organic or inorganic. Suitable acidic materials include boric acid, sodium dihydrogen phosphate, fumaric acid, malonic acid, oxalic acid, citric acid, tartaric acid, potassium acid tartrate, chloroacetic acid, maleic acid, succinic acid, glutaric acid and phthalic acid. In place of the anhydrous acids or salts there can be used the solid hydrates, e.g., oxalic acid dihydrate and citric acid monohydrate.

While not essential, there can also be added a wetting agent such as Bayol 35 (a petroleum aliphatic hydrocarbon white oil), kerosene having an average of at least 8 carbon atoms in the molecule, alkylphenolalkylene oxide adducts e.g., Triton X-100 (t-octylphenol-ethylene oxide adduct having 10 ethylene oxide units in the molecule), sodium lauryl sulfate and sodium dodecylbenzene sulfonate. The wetting agent can be nonionic or anionic.

One mode of incorporating the foaming agent into the polymer is by premixing the pelletized, solid, thermoplastic polymer, e.g., high impact styrene polymer, with a minor amount of an absorbent having absorbed thereon a volatile liquid, i.e., the foaming agent) which is nonreactive with and which has not more than a slight solvent action on the polymer. The volatile liquid should volatilize below the softening point of the polymer.

As the absorbent there can be employed any conventional absorbent in finely divided form, such as diatomaceous earth (Celite), Fuller's earth, silica gel, e.g., Cab-O-Sil and Hi-Sil, activated alumina, molecular sieves, attapulgus clay and activated carbon. The absorbent is usually used in an amount of 0.1 to 15%, preferably 0.5 to 10% by weight of the polymer, although up to 25 or 30% of absorbent can be employed. The absorbent is an inert filler of large surface area but small particle size, e.g., 200 mesh or below.

As the volatile liquid there can be used aliphatic hydrocarbons boiling between 10° and 100° C. and preferably between 30° and 90° C., e.g. petroleum ether (containing primarily pentane or hexane or a mixture of these hydrocarbons), pentane, hexane, isopentane, heptane, cyclohexane, cyclopentane, pentadiene and neopentane. Other volatile liquids include methanol, ethanol, methyl acetate, ethyl acetate, butane, acetone, methyl formate, ethyl formate, dichloroethylene, dichlorodifluoromethane, perchloroethylene, dichlorotetrafluoroethane, isopropyl chloride, carbontetrachloride, monochlorotrifluoroethylene, propionaldehyde, diisopropyl ether, dichlorodifluoromethare, a mixture of pentane with 5 to 30% of methylene chloride or other volatile lower halogenated hydrocarbon.

The mount of volatile liquid absorbed on the absorbent can vary from 5 to 150% or more based on the weight of the absorbent. The amount of liquid absorbed will depend upon the capacity of the absorbent for the particular liquid. Normally, the absorbent containing the volatile liquid will appear to be a dry powder. The volatile liquid employed should be one which is nonreactive with the particular polymer employed. Usually, the amount of volatile liquid will be 0.1 to 15% by weight of the polymer to be expanded. The amount of volatile liquid will depend upon the extent of foaming desired. In general, the greater the amount of absorbed volatile liquid in the polymer-absorbent mixture the more the expansion. It has been found that good expansion can be obtained using very small amounts of the volatile liquid.

The free-flowing powder consisting of the low boiling solvent or semi-solvent absorbed on the inert filler of large surface area is added to the extrusion grade plastic pellets, preferably along with the nucleating agent, and tumbled in a mixer. The powder containing the volatile blowing agent will then disperse uniformly throughout the mixture while adhering to the plastic pellets. The mixture is then fed into the hopper of a screw extruder.

Instead of absorbing the volatile liquid on a filler, there can be employed conventional expansible thermoplastic materials such as expandible polystyrene containing 1 to 9% of one of the volatile liquids, e.g., Dow-Pelespan 101 (expansible polystyrene beads containing 6% pentane).

While specific embodiments of process steps and materials have been described, the details thereof are not intended to be limiting except as they appear in the appended claims.

What is claimed is:

1. In a process for extruding a thick body of foamed plastic material having uniform density in transverse directions, the improvement which comprises: extruding a foamable plastic material in the form of a single tubular body having a bore of substantial size which conforms in transverse shape generally to the transverse shape of the initially extruded body; at least substantially closing said bore by releasing the pressure on the body to cause said extruded plastic material to expand and fill said bore with foamed plastic material.

2. A process for extruding a thick sheetlike body of foamed plastic material which in its final form is free of continuous holes extending in the direction of extrusion and which has uniform density and smooth external surfaces, said process comprising extruding a foamable plastic composition in the initial form of a tubular body having in transverse cross section a relatively great width and a smaller thickness, said tubular body having a bore comprising at least one hole extending in the direction of extrusion, the cross section of said bore in transverse cross section having a long and short dimension which extend generally in the directions of the width and thickness of the body, and then substantially closing said bore by releasing the pressure on said initially extruded tubular body and expanding the same in a direction transvere to the direction of extrusion until the walls of said bore substantially contact each other thereby producing a sheet-like body of uniform density.

3. A process as in claim 2 including the step of compressing the foamed body to insure coalescence of the walls of said bore.

4. A process as in claim 2 wherein said tubular body is expanded to produce a sheet-like body at least 1/10 inch thick.

5. A process as in claim 2 wherein the ratio of the total width to the total thickness of said tubular body is at least 6 to 1.

6. A process as in claim 2 wherein the ratio of the short dimension of said bore cross section to the thickness of said tubular body is greater than 0.25.

7. A process as in claim 2 wherein the bore of the initially extruded body is a single hole of generally rectangular cross section.

8. A process as in claim 2 wherein the bore of the initially extruded body is in the form of a plurality of spaced apart holes.

9. A process for producing a thick sheet-like body of foamed plastic material having in transverse cross section a thickness of at least about 1/10 inch and a ratio of width to thickness of greater than about 6 to 1, said sheet-like body being free of continuous holes and having substantially uniform density throughout and substantially smooth external surfaces, said process comprising extruding a tubular body of foamable plastic material, said tubular body in its freshly extruded form having a bore of substantial cross sectional area and an overall elongated cross sectional shape which is about the same as the cross sectional shape of the desired final sheet, said tubular body having walls of such thickness that upon complete foaming of the plastic the walls will expand in a direction transverse to the direction of extrusion to substantially fill said bore; and then completely foaming said extruded tubular body by releasing the pressure thereon to cause the walls which form the width of said tubular body to expand into and substantially close said bore.

References Cited

UNITED STATES PATENTS

| | | | |
|---|---|---|---|
| 2,209,643 | 7/1940 | Chamblin | 18—12 |
| 2,644,983 | 7/1953 | Curtiss | 18—14 |
| 3,026,564 | 3/1962 | Kohlwey | 18—14 |
| 3,121,130 | 3/1964 | Wiley et al. | 264—53 |
| 3,174,887 | 3/1965 | Voelker | 264—47 XR |

JULIUS FROME, *Primary Examiner.*

P. E. ANDERSON, *Assistant Examiner.*